(12) United States Patent
Goodrich

(10) Patent No.: US 8,017,683 B1
(45) Date of Patent: Sep. 13, 2011

(54) TEMPORARY PIPE DAMMING COMPOSITION, METHOD OF MANUFACTURE, AND METHOD OF USE

(76) Inventor: Danilo Fernando Goodrich, Miami, FL (US)

(*) Notice: Subject to any disclaimer, the term of this patent is extended or adjusted under 35 U.S.C. 154(b) by 0 days.

(21) Appl. No.: 12/816,859

(22) Filed: Jun. 16, 2010

(51) Int. Cl.
*C08L 31/00* (2006.01)
(52) U.S. Cl. .......................... 524/556; 138/89
(58) Field of Classification Search .................. 524/556; 138/89
See application file for complete search history.

(56) References Cited

U.S. PATENT DOCUMENTS

| | | | |
|---|---|---|---|
| 4,357,960 | A | 11/1982 | Han |
| 4,739,799 | A | 4/1988 | Carney et al. |
| 5,043,196 | A | 8/1991 | Lacourse et al. |
| 5,318,075 | A | 6/1994 | Roll |
| 6,712,097 | B1 | 3/2004 | Schabel |

*Primary Examiner* — David W Wu
*Assistant Examiner* — Vu A Nguyen
(74) *Attorney, Agent, or Firm* — Gold & Rizvi, P.A.; Glenn E. Gold; H. John Rizvi

(57) ABSTRACT

A temporary pipe damming composition comprising water, shredded paper, triethanolamine, Carbomer, and a preservative are mixed into a dough-like consistency. The damming composition is molded and inserted into a pipe to isolate any water or moisture from a working area. The plumber assembles the piping, securing the joints via a sweating process. The damming composition is dissolved by increasing the water pressure after completion and inspection of the plumbing work.

18 Claims, 4 Drawing Sheets

TEMPORARY PIPE DAMMING COMPOSITION, METHOD OF MANUFACTURE, AND METHOD OF USE

FIELD OF THE INVENTION

The present disclosure generally relates to a composition and method for aiding in sweating a piping joint. More particularly, the present disclosure relates to a semi solid, water soluble composition and the process of inserting the composition into an interior of a pipe to isolate moisture from a joint being sweated, then removing the composition via fluid pressure and dissolution.

BACKGROUND OF THE INVENTION

Pipe sweating is a trade term for soldering pipes together. This type of pipe sweating is performed with a propane torch. The copper pipes to be joined are heated at the juncture point, and then solder—a metal compound that is heated and used like glue between the two pipes—is applied. Pipe sweating can be a tricky venture for beginners, and it often takes a little while for a novice to get the feel of it.

Pipes cannot be soldered if water is in them. Water prevents the pipes from reaching a hot enough temperature to melt solder. One known means of ensuring water is isolated from the working area is to insert a piece of bread (without its crust) into the pipe holding back a gradual flow of water. The bread will dissolve when the water is turned back on. The problem with this is that the bread can become moldy, the bread takes an inconsistent amount of time to degrade, and the bread could cause temporary clogging.

Another known embodiment utilises a mechanical seal that is inserted into the plumbing to isolate any moisture from the area being brazed or soldered. This requires access to the device both before and after the sweating process. Since the device needs to be removed from the plumbing, the process requires at least one joint that is formed without using an isolation device.

Therefore, a water isolation composition that can be inserted into a piping configuration and dissolves when subjected to a water pressure/flow for use during a sweating process, is needed.

Several ingredients are known.

Ultrez 21 is a polymer that is a hydrophobically modified cross-linked acrylate copolymer and is designed to efficiently impart thickening, stabilising, and suspending properties designed for use in a variety of personal care applications. The polymer incorporates patented technology, which allows it to quickly and easily self-wet. Ultrez 21 is a trade name, generically referred to via its chemical reference of Acrylates/C10-30 Alkyl Acrylate Crosspolymer.

Triethanolamine, often abbreviated as TEA, is an organic chemical compound, which is both a tertiary amine and a tri-alcohol. A tri-alcohol is a molecule with three hydroxyl groups. Like other amines, Triethanolamine acts as a weak base due to the lone pair of electrons on the nitrogen atom.

Triethanolamine is commonly used as a pH balancer in cosmetic preparations in a variety of different products—ranging from skin lotion, eye gels, moisturizers, shampoos, shaving foams etc. Another common use of TEA is as a complexing agent for aluminium ions in aqueous solutions. This reaction is often used to mask such ions before performing what is called a complexometric titration with another chelating agent such as EDTA, which will form stable complexes with most metallic ions.

SUMMARY OF THE INVENTION

The present disclosure is generally directed to a water soluble composition for insertion into a piping configuration during a sweating process. The composition is inserted into a pipe creating a barrier for any water flow or moisture, thus allowing a plumber to adequately form a piping joint using a soldering or brazing process. The composition decomposes when subjected to an increased water pressure and subsequent flow.

In some embodiments, the temporary pipe damming composition may include:
  a volume of water;
  a volume of shredded paper;
  a volume of Carbomer;
  a volume of Triethanolamine; and
  a volume of Neolone.

In another aspect, the volume of water is preferably 85.1% of the total, having a range of +/−5%. It is desired that the water is de-ionized.

In still another aspect, the volume of shredded paper is preferably 8.8% of the total, having a range of +10%/−4%. It is desired that the shredded paper is siliconized shredded paper (fine grit).

In yet another aspect, the volume of Triethanolamine is preferably 3.0% of the total, having a range of +3%/−1%.

In a still further aspect, the volume of a Carbomer such as Acrylates/C10-30 Alkyl Acrylate Crosspolymer (Ultrez 21) is preferably 3.0% of the total, having a range of +3%/−1%.

In another aspect, the volume of a preservative (such as Neolone 950) is preferably 0.1% of the total, having a range of +0.3%/−0.1%.

In yet another aspect, a volume of a coloring agent (preferably FDA approved) can be added.

Continuing with another aspect, the composition is mixed in accordance with the following steps:
  a. Mix the shredded paper and water within a mixer until the solution is homogeneous.
  b. Add Ultrez 21 and agitate until the composition turns into a dough-like semi-solid ball.
  c. Add Triethanolamine and Neolone 950 and continue mixing. The Triethanolamine is used to neutralize the composition. The composition will separate from the wall of the mixing container.
  d. In an optional step, a coloring agent can be added to the composition.

In a still further aspect, the composition is formed and inserted into a pipe. The plumber then forms the joint using common sweating practices. The water is turned on, increasing the water pressure in the piping. The water pressure separates the composition from the piping as well as dissolving the composition.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
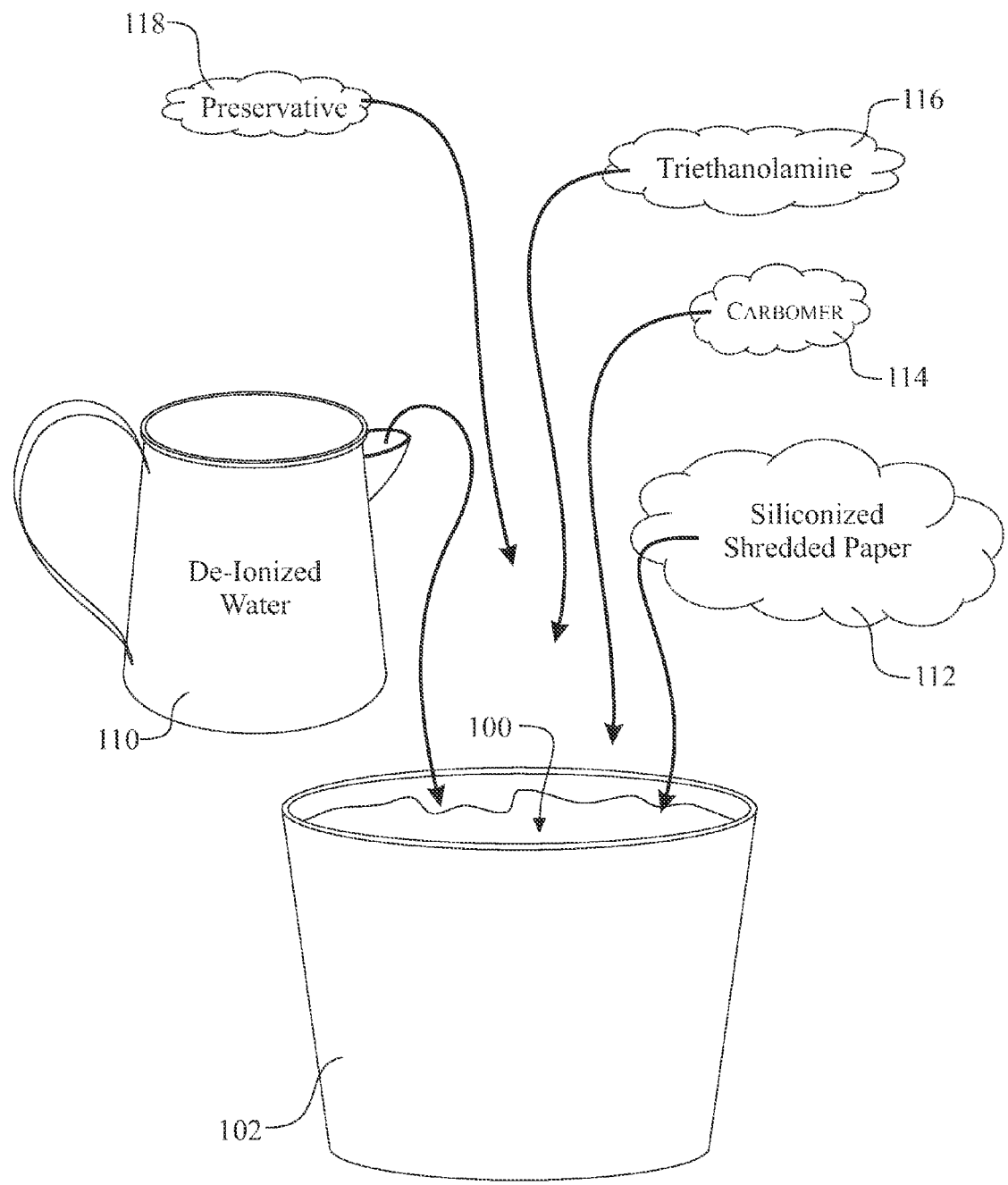
FIG. 1 presents an exemplary block diagram representative of ingredients of a temporary pipe damming composition.
Figure 2:
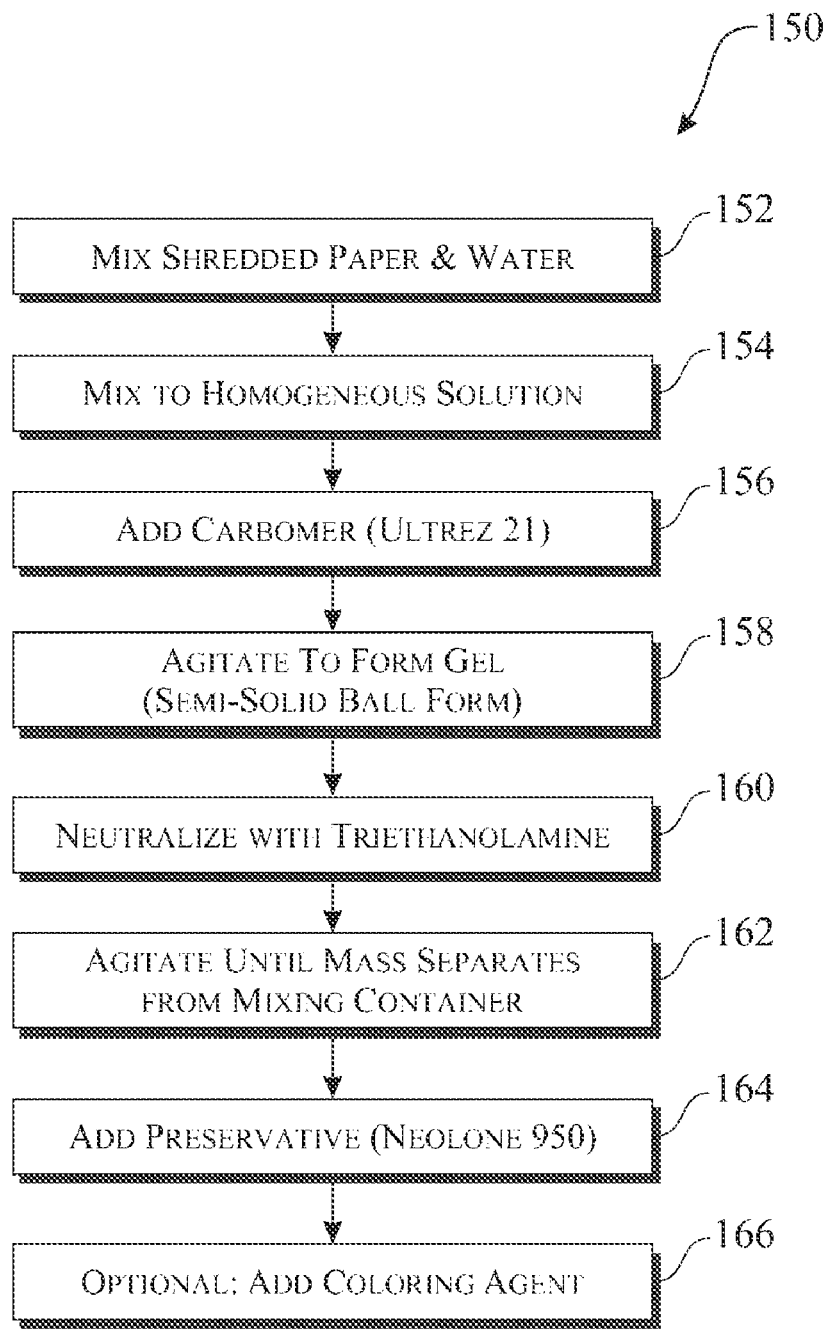
FIG. 2 presents an exemplary flow diagram representative of a mixing process for forming the temporary pipe damming composition.

A temporary pipe damming composition 100 is formed adhering to a recipe presented in FIGS. 1 and 2. A volume of water 110 and shredded paper 112 are dispensed into a mixing container 102 in accordance with a primary ingredients mixing step 152 illustrated in the exemplary mixing flow diagram 150. The water 110 is preferably de-ionized water. The shredded paper 112 is preferably siliconized shredded paper and more so having a fine grit. The water 110 and shredded paper 112 are mixed to a homogeneous solution 154. A volume of Carbomer 114 is added in accordance with a Carbomer addition step 156. The Carbomer can be such as Acrylates/C10-30 Alkyl Acrylate Crosspolymer (Ultrez 21). The mixture is agitated until it forms a dough-like consistence or a semi-solid ball form, via a gel forming step 158. Adding a volume of Triethanolamine 116, as referred to as a neutralization step 160, subsequently neutralizes the temporary pipe damming composition 100. The temporary pipe damming composition 100 is further mixed until the mass separates from the surfaces of the mixing container 102, as described in a continued mixing step 162. A volume of preservative 118 is then added to the temporary pipe damming composition 100 in accordance to a preservative introduction step 164. The preservative can be any reasonable composition, with the preferred embodiment being Neolone 950. An optional coloring agent can be added to the temporary pipe damming composition 100 via a color additive step 166. The optional coloring agent is preferably FDA approved. The temporary pipe damming composition 100 can be stored for long periods of time without concerns of mold, separation, decay, or other degrading processes.

The volumes of the various ingredients are presented in the table below:

TABLE 1

Composition Ingredients

| Ingredient | Low | Target | High | Approx. Tolerance |
|---|---|---|---|---|
| Water | 80.0% | 85.1% | 90.0% | −5.0%/+5.0% |
| Shredded Paper | 4.5% | 8.8% | 19.0% | −4.5%/+10.0% |
| Triethanolamine | 1.5% | 3.0% | 6.0% | −1.5%/+3.0% |
| Carbomer | 1.5% | 3.0% | 6.0% | −1.5%/+3.0% |
| Preservative | 0.0% | 0.1% | 0.4% | −0.1%/+0.3% |
| Coloring Agent | | As desired | | |

Figure 3:
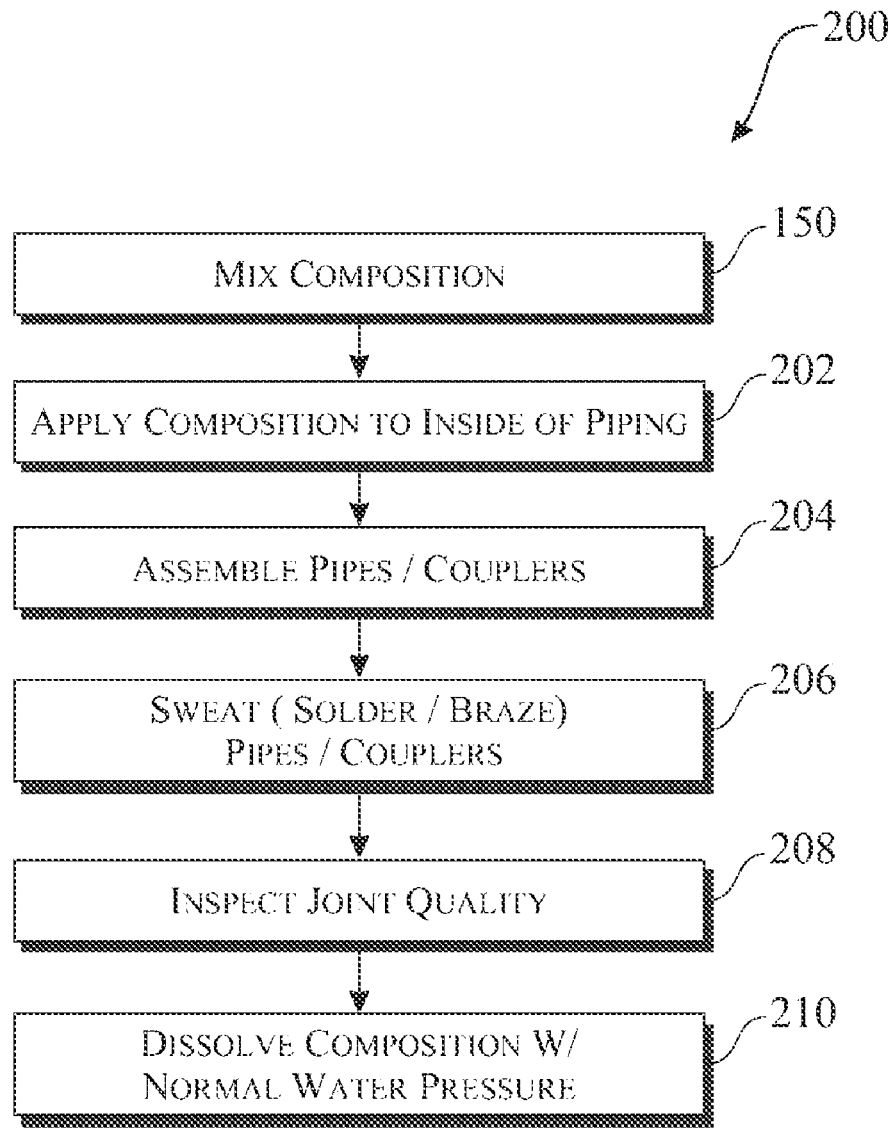
FIG. 3 presents an exemplary flow diagram representative of a sweating process utilizing the temporary pipe damming composition.
Figure 4:
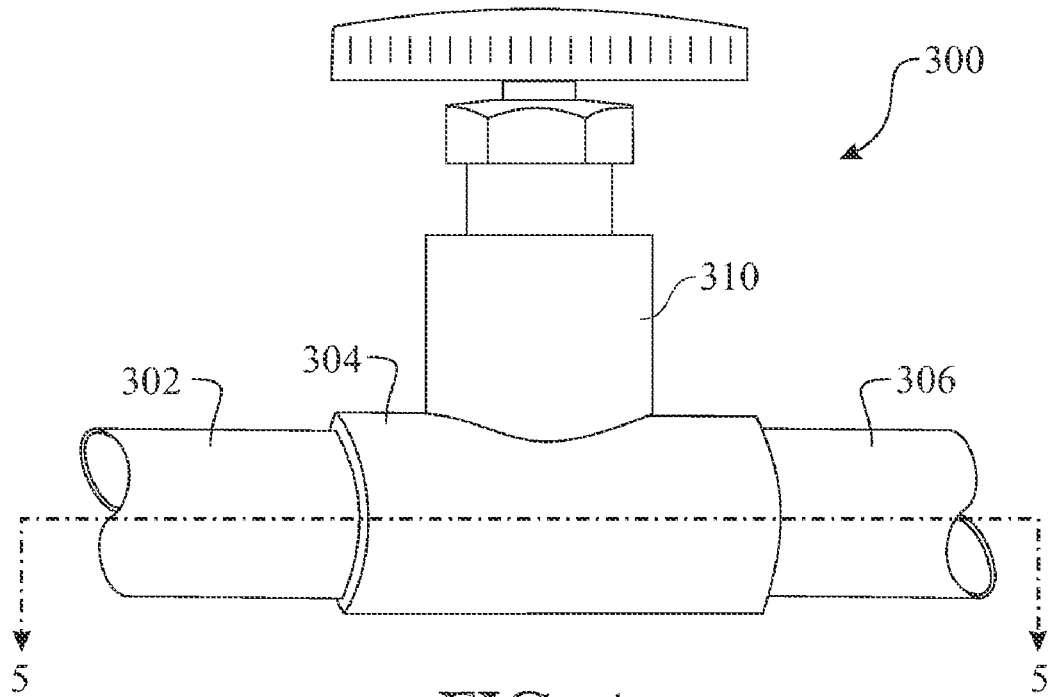
FIG. 4 presents an elevation view demonstrating an exemplary application of the temporary pipe damming composition.
Figure 5:
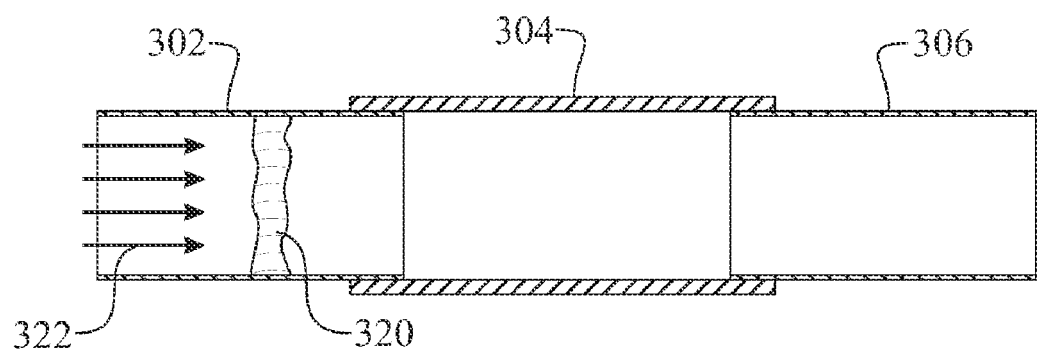
FIG. 5 presents a sectional view taken along section 5-5 of FIG. 4, demonstrating an exemplary application of the temporary pipe damming composition.

An exemplary method of use of the temporary pipe damming composition 100 is presented in a sweating process flow diagram 200 of FIG. 3 and respective exemplary illustrations of a plumbing joint configuration 300 presented in FIGS. 4 and 5. The user removes a temporary pipe damming composition mass 320 from the available mixed volume of temporary pipe damming composition 100 formed in accordance with the mixing flow diagram 150. The plumber shapes the temporary pipe damming composition mass 320 into a ball or disc shape and inserts the temporary pipe damming composition mass 320 into a water source pipe 302, referred to as a composition insertion step 202. The plumber then assembles the various components 204, such as slipping a coupling member 304 (in this case the coupling member 304 is a subcomponent of a valve assembly 310) over a prepared end of the water source pipe 302. The plumber prepares the contacting surface of each component by abrading the surface and cleaning with a respective cleaning solution. The exemplary illustration inserts a distribution piping 306 into a discharging end of the coupling member 304. The plumber can apply flux to each of the connecting surfaces during the assembly process. The plumber forms the joint via a sweating process (soldering, brazing, or similar) via a sweating step 206. The joint is inspected 208 to ensure it is meets quality standards. Once the plumber determines that all of the assembly work is completed and inspected, the plumber increases the water pressure to the fluid 322. The fluid 322, when pressurized, dissolves the temporary pipe damming composition 100, as referenced in a dissolving step 210.

An advantage of the present invention is the ability to assemble a closed piping configuration, as the temporary pipe damming composition 100 is dissolved by the flow of water. The temporary pipe damming composition 100 dissolves in a predictable manner. The temporary pipe damming composition 100 maintains a long shelf life.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A temporary pipe damming composition, comprising:
water being of at least 75% of the total volume of the composition;
shredded paper being of at least 4% of the total volume of the composition; and a Carbomer of sufficient percentage of the total volume of the composition to solidify the composition into a dough-like consistency.

2. A temporary pipe damming composition as recited in claim 1, the composition further comprising a neutralizer for neutralizing an acid-base reaction, being at least 1% of the total volume of the composition.

3. A temporary pipe damming composition as recited in claim 2, the composition further comprising a preservative.

4. A temporary pipe damming composition as recited in claim 1, the composition further comprising a preservative.

5. A temporary pipe damming composition as recited in claim 1, wherein the water is de-ionized.

6. A temporary pipe damming composition as recited in claim 1, wherein the shredded paper is siliconized shredded paper.

7. A temporary pipe damming composition as recited in claim 6, wherein the siliconized shredded paper is of a fine grit.

8. A temporary pipe damming composition as recited in claim 1, the composition further comprising a coloring agent.

9. A temporary pipe damming composition, comprising:
    water being between 80 and 90% of the total volume of the composition;
    shredded paper being between 4.5 and 19% of the total volume of the composition; and
    a Carbomer being between 1.5 and 6% of the total volume to solidify the composition into a dough-like consistency.

10. A temporary pipe damming composition as recited in claim 9, the composition further comprising a neutralizer for neutralizing an acid-base reaction, being between 1.5 and 6% of the total volume of the composition.

11. A temporary pipe damming composition as recited in claim 10, the composition further comprising a preservative.

12. A temporary pipe damming composition as recited in claim 9, the composition further comprising a preservative.

13. A temporary pipe damming composition as recited in claim 9, wherein the water is de-ionized.

14. A temporary pipe damming composition as recited in claim 9, wherein the shredded paper is siliconized shredded paper.

15. A temporary pipe damming composition as recited in claim 14, wherein the siliconized shredded paper is of a fine grit.

16. A temporary pipe damming composition as recited in claim 9, the composition further comprising a coloring agent.

17. A method of forming a plumbing joint, the method comprising the steps:
    obtaining a temporary pipe damming composition, the composition comprising:
        water being between 80 and 90% of the total volume of the composition;
        shredded paper being between 4.5 and 19% of the total volume of the composition; and
        a Carbomer being between 1.5 and 6% of the total volume to solidify the composition into a dough-like consistency;
    forming a sufficient volume of the temporary pipe damming composition into a usable shape;
    inserting the formed temporary pipe damming composition into a pipe;
    assembling at least two components to form a joint therebetween; and
    sweating the joint.

18. A method of forming a plumbing joint as recited in claim 17, the method further comprising the step:
    dissolving the temporary pipe damming composition from within the piping via increasing a water pressure within the piping.

* * * * *